No. 731,011. PATENTED JUNE 16, 1903.
B. W. AUGUSTINE.
MOLDING GRAINING MACHINE.
APPLICATION FILED JUNE 3, 1901.

NO MODEL.

WITNESSES:
Jno. D. Robbins
M. M. Noble

INVENTOR.
BERNARD W. AUGUSTINE.
BY
E. F. Murdock & Co.
ATTORNEYS.

No. 731,011. Patented June 16, 1903.

UNITED STATES PATENT OFFICE.

BERNARD W. AUGUSTINE, OF ALAMEDA, CALIFORNIA.

MOLDING-GRAINING MACHINE.

SPECIFICATION forming part of Letters Patent No. 731,011, dated June 16, 1903.

Application filed June 3, 1901. Serial No. 63,032. (No model.)

*To all whom it may concern:*

Be it known that I, BERNARD W. AUGUSTINE, a citizen of the United States, residing at 1000 Pacific avenue, Alameda, in the county of Alameda and State of California, have invented certain new and useful Improvements in Molding-Graining Machines; and I do hereby declare the following to be a full, clear, and exact description of said invention, such as will enable others skilled in the art to which it most nearly appertains to make, use, and practice the same.

This invention relates to improvements in "wood-graining machines," and particularly to "molding-graining machines." Attention is directed to application filed July 6, 1900, Serial No. 22,749, allowed December 27, 1900, of which this present application is a modification.

The object which the present invention has in view is to reproduce accurately a grain taken from the surface of one board and imprint it upon another board, such as beading or molding having convoluted surfaces.

With this object in view the invention consists in the novel arrangement and combination of parts, which will be more fully described in the following specification and pointed out in the appended claims.

Figure 1:
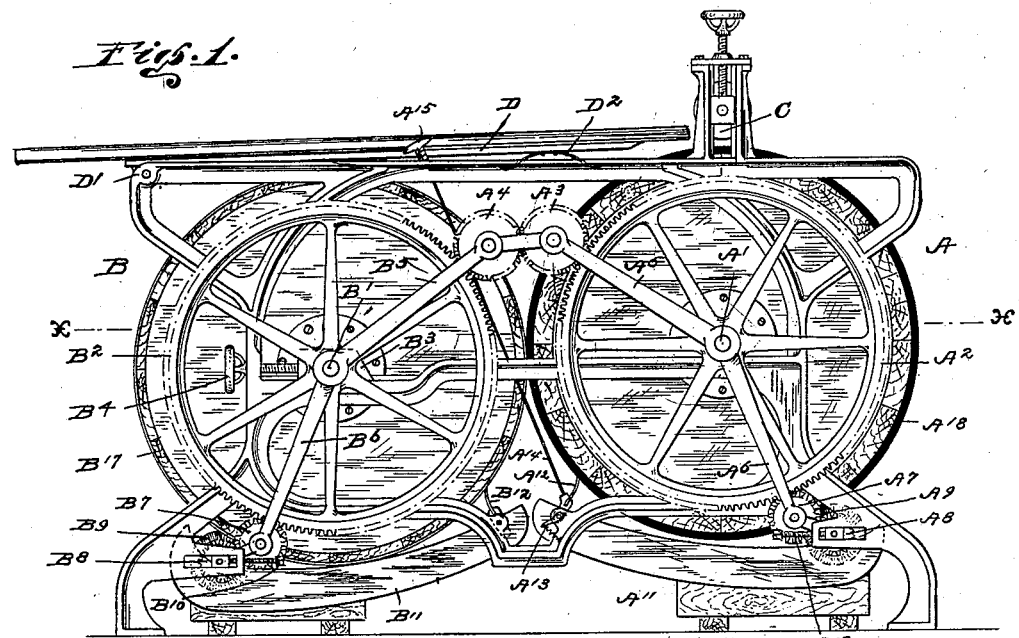
Figure 2:
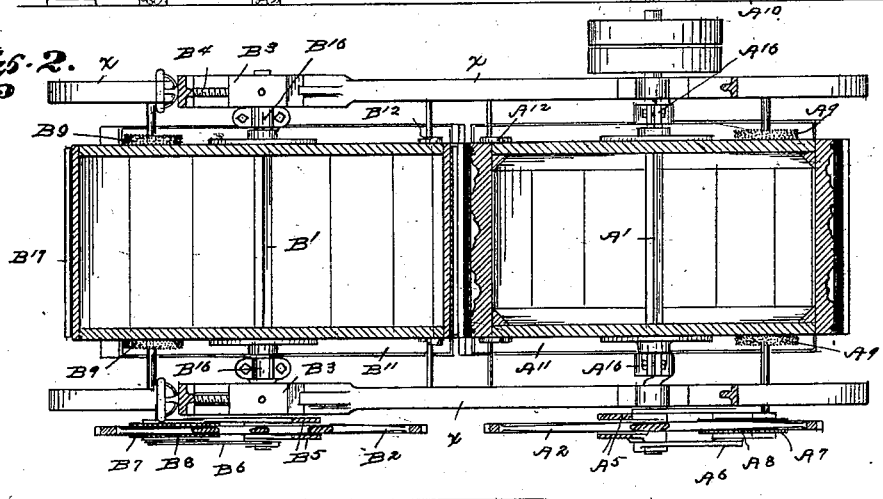
Figure 3:
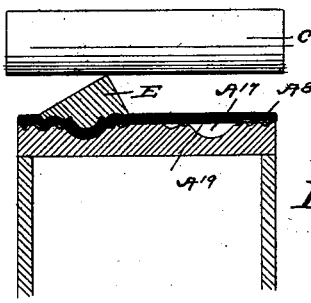

In the drawings, Figure 1 is a side elevation of a molding-graining machine constructed in accordance with this invention. Fig. 2 is a plan view of the same in cross-section, taken on the line $x\,x$, Fig. 1. Fig. 3 is a fragmentary diagrammatic view in cross-section, showing the molding embedded in the printing-roller.

In the description with reference to the drawings distinguishing letters of reference will be assigned to the various groups of mechanisms, the subsidiary parts of such groups being distinguished by the addition of a numeral to the common letter.

The construction consists of the printing-roller A, mounted upon the driving-shaft $A'$, journaled in the frame X. The rotation of the driving-shaft is transmitted through the large gear-wheel $A^2$, through the idlers $A^3$ $A^4$, to the gear-wheel $B^2$, fixed upon the shaft $B'$ of the form-roller B. The shaft $B'$ is journaled in the boxes $B^3$, adjustable laterally in the frame X by the screw $B^4$, threaded in the frame and swiveled in the boxes $B^3$. This admits of adjustment between the rollers A and B. The idlers $A^3$ $A^4$ are linked together, supported by the arms $A^5$ $B^5$, extending from the shafts $A'\,B'$, respectively. This arrangement of the idlers insures engagement at all times between $A^2$ and $B^2$ in the relative adjustment of A and B.

The arms $A^6$ $B^6$, idlers $A^7$ $B^7$, linked to pinions $A^8$ $B^8$, transmit rotation from $A^2$ and $B^2$, respectively, to the rotary brushes $A^9$ $B^9$, which are slidably mounted in the frame X and adjustable by the screws $A^{10}$ and $B^{10}$ with relation to the pressure upon the surface of their respective rollers. The brushes $A^9$ $B^9$ are submerged into the liquids contained in the pans $A^{11}$ $B^{11}$. The scrapers $A^{12}$ $B^{12}$ are mounted in the frame X in contact with the surface of their respective rollers, the former having the extension $A^{13}$ fixed upon its shaft and tied by a spring to the frame X in such a manner that the scraper is normally maintained out of contact with the roller A, the pressure being regulated through the rods $A^{14}$ upon both sides of the machine, extending loosely into the handles $A^{15}$, threaded into the flange of the frame X.

The shafts $A'\,B'$ are coupled to the rollers A and B at $A^{16}$ and $B^{16}$ in such a manner that the rollers may be removed and replaced without disturbing the adjustment of the running-gear. This may be accomplished by forming on one end of the roller a trunnion to enter the journal-box thereat and on the opposite side of the roller a clamp-socket to receive the end of the driving-shaft. By removing the top of the trunnion-box and releasing the clamp-socket the roller may be removed, leaving the driving-shaft undisturbed in its journal-box.

The peripheral surface of the roller A is provided with annular grooves $A^{17}$, over which the elastic sensitive composition $A^{18}$ is stretched. The grooves $A^{17}$ approximate the cross-section of the molding to be treated. The roller A is made up in the shape of a hollow drum, as shown, set into a cylindrical mold and the composition $A^{18}$ cast thereon. To prevent the composition $A^{18}$ filling the grooves $A^{17}$ as it is poured into the mold, a thin sheet of rubber $A^{19}$ is stretched over the drum before pouring the composition, which adheres to the rubber. The composition $A^{18}$ is very tough and resilient, resembling the "hectograph" composition in its affinity for the printing compound.

The peripheral surface of the roller B consists of a heavy veneer $B^{17}$ of the wood to be imitated, joined in such a manner that the joint does not appear in the impression transferred to the printing-roller. This is easily accomplished by a lapping of irregular outline.

The roller C, adjustably mounted in the frame X, regulates the pressure between the molding being treated and the roller A.

The feed-table consists of the platform D, hinged at D' between the two sides of the frame X, between which it extends. The springs $D^2$ rest upon lugs on the inside of the frame X to hold the molding E resting thereon at an angle out of contact with the surface of the roller A until forced under the roller C. This construction is necesary to prevent the end of the molding coming into contact with the roller A before it can carry the molding entirely through. Should the molding E be forced against A, it would injure the composition $A^{18}$ or blur the transfer impression thereon.

In operation the pan $B^{11}$ is partially filled with a wood filler of the desired color, which is transferred by the brush $B^9$ to the surface of the roller B, the superfluous adherence being removed by the scraper $B^{12}$, leaving the capillary interstices of the grain of $B^{17}$ filled. The roller B is adjusted to light contact with $A^{18}$, which picks the filler from $B^{17}$ to its own surface, producing a negative outline of the grain of $B^{17}$. This in turn is printed upon the surface of the molding as same passes through the machine. The molding squeezing the composition down into the groove $A^{17}$ compels it to conform to the convolutions of the molding, in this manner printing upon the whole surface of the molding. The pan $A^{11}$ is filled with benzene or a suitable solvent, which cleans the surface of the composition $A^{18}$ by means of the brush $A^9$ and scraper $A^{12}$, leaving the surface clean for a new negative from the grain $B^{17}$.

If the scraper $A^{12}$ is permitted to rest against the composition when the machine is out of operation, it "sets" and leaves a mark upon the surface of the composition, hence the spring adjustment for readily relieving the scraper when not operating. For the same reason the roller B and brush $A^9$ are backed out of contact with the composition when the machine is out of operation.

It is essential to have a positive gearing such as shown between the rollers A and B. Any play or drag in their contact would blur the negative transfer to the composition $A^{18}$.

Having thus described this invention, what is claimed is—

1. In a machine of the class described, the combination with a printing-roller having circumferential depressions in its surface, of a resilient surface over said depressions adapted to be pressed into the depressions.

2. In a machine of the class described, the combination with a printing-roller, of a spring-pressed platform for holding the work to be treated by the roller, and means for holding the work on the platform against the printing-roller.

3. In a machine of the class described, the combination with a form-roller, of a printing-roller having depressions constituting a pattern, a resilient printing-surface over said depressions and carried by the printing-roller, means for holding the printing and form rollers in adjustable contact with each other, and means for holding the work in contact with the printing-roller.

4. In a machine of the nature indicated, a printing-roller having a resilient surface, with annular grooves under said resilient surface; substantially as described.

5. In a machine of the class described, the combination of a form-roller, a printing-roller, means for rotating said rollers in unison independent of contact with each other, a feed-roller adapted to hold the work in contact with said printing-roller, and means whereby said feed-roller is adjusted.

6. In a machine of the class described, the combination with a printing-roller, a form-roller, of means for holding the work out of contact with the printing-roller, and means whereby said work is held in contact with said roller.

7. In a machine of the class described, the combination with a printing-roller, a form-roller, a spring adapted to hold the work out of contact with the printing-roller, and an adjustable roller for holding the work in contact with the printing-roller.

8. In a machine of the class described, the combination with a printing-roller having a hard body, circumferential depressions in the periphery of said body, of a resilient or flexible surface over said body adapted to enter said depressions, and means for forcing said resilient material and work into said depressions.

9. In a machine of the class described, the combination with a printing-roller, a form-roller, means for adjusting said form-roller, of rotary brushes engaging said rollers, and means controlled by the adjusting means of said form-roller, whereby the brushes are held in the same relation to the rollers at all times.

10. In a machine of the class described, the combination with a printing-roller having suitably-formed depressions existing in its surface, of a resilient surface over said depressions adapted to be pressed into said depressions.

In testimony whereof I have hereunto set my hand this 27th day of May, 1901.

BERNARD W. AUGUSTINE.

Witnesses:
BALDWIN VALE,
GEORGE F. HATTON.